Patented Jan. 16, 1934

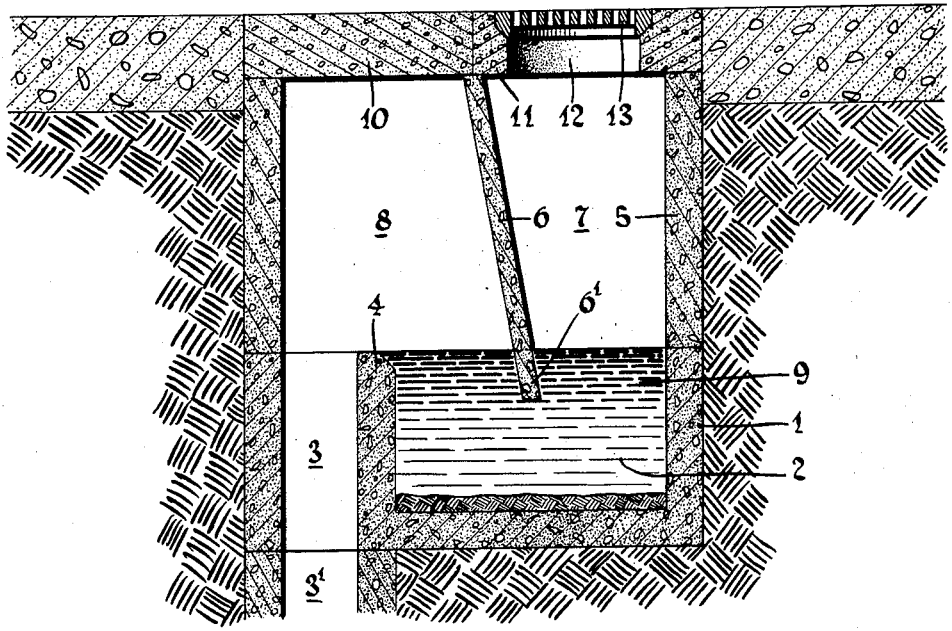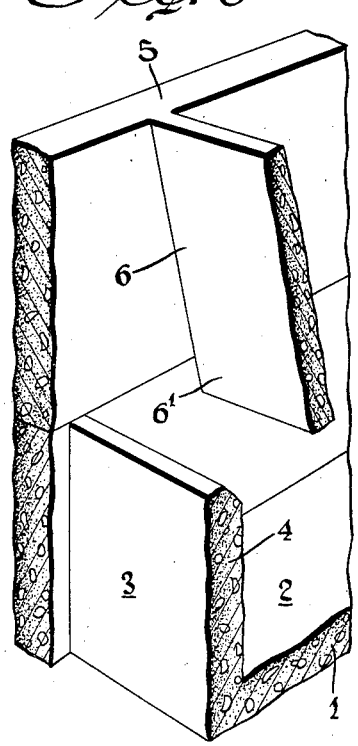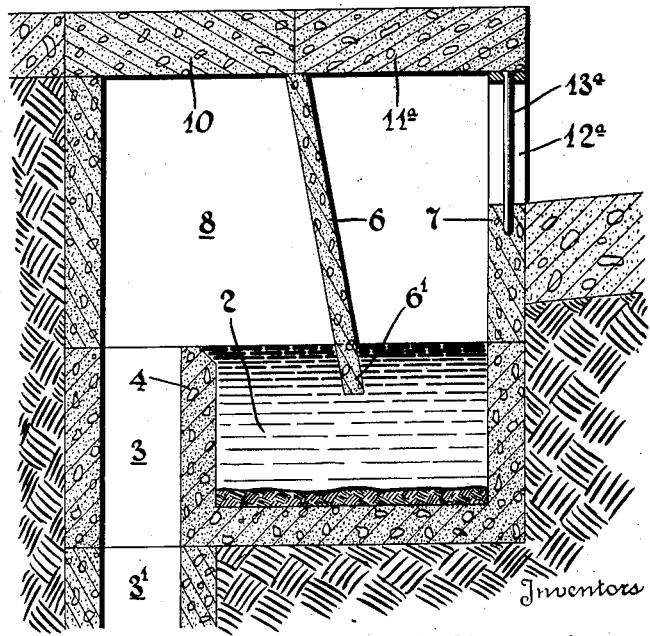

1,943,690

UNITED STATES PATENT OFFICE 1,943,690

SEWER TRAP

Robert T. Morrison and Robert J. Croft,
Le Roy, N. Y.

Application October 10, 1932. Serial No. 637,182

7 Claims. (Cl. 182—3)

This invention relates to a sewer trap primarily designed for use in conducting drainage from the streets in cities and towns.

Heretofore traps for this purpose have been constructed of terra cotta pipe. By reason of their construction it is difficult to clean the traps and to gain access to the discharge side thereof. Furthermore, by reason of their construction, the water in the bowls of the traps will at times freeze and not only interrupt the functioning of the traps but also break the confining walls and thereby render the trap inefficient and undesirable.

The present invention has for its object to provide an improved trap which is of simple construction, is readily accessible for the purpose of cleaning the same, and possesses great utility.

In the drawing:

Fig. 1 is a sectional view through the improved trap and discloses the preferred sectional construction thereof.

Fig. 2 is a similar view through the trap, slightly modified to adapt the same for installation in the curb structure.

Fig. 3 is a fragmentary perspective view of a pair of superimposed sections of the trap.

In proceeding in accordance with the present invention, the trap comprises a plurality of sections which are preferably molded or cast from some proper material, the sections herein illustrated being of cement or concrete formation. The trap may be constructed of any requisite number of sections, that illustrated comprising two sections a lower section and an upper section. The lower section 1 is provided with a catch basin or bowl 2 and an outflow or discharge passage 3 which is separated from the catch basin by the partitioning wall 4. Overflow from the catch basin passes over the wall 4 into the discharge 3 which is connected to the sewer by a pipe or conductor 3'.

The upper section 5 is divided by a partition 6 into an inflow passage 7 and an outflow passage 8. When assembled, the two sections are mechanically interlocked so as to insure proper alignment and juxtaposition. The interlock, according to the present disclosure, comprises a downward extension 6' of the partitioning wall 6, such downward extension snugly fitting between and engaging the opposed side walls of the section 1 as is shown clearly in Fig. 3. Such interlock prevents lateral displacement of one section relative to the other and further provides for a well defined liquid seal against the exit of any sewer gas through the trap by reason of the extension 6' submerging into the liquid of the basin. The partition wall 6 is preferably disposed at an inclination so as to provide a wide mouth into the trap and a relatively small neck at the bottom of the passage 7 into the basin so that a comparatively small liquid surface will be exposed at the street side of the trap.

The partitioning wall 6 is preferably much thinner than the walls of the casings 1 and 5 which latter are necessarily of sufficient strength to give substantial support to the trap. By making partition walls 6 thin, heat is easily conducted therethrough and therefore any heat arising from the sewer through the discharge 3 and into the compartment 8 will be transmitted through such thin partition to moderate the temperature of the air in the mouth passage 7 to prevent freezing of the liquid surface in the throat 9 when the outside temperature is freezing.

The trap chambers are closed by a pair of covers 10 and 11, the latter being provided with an opening 12 across which extends a grating 13. The opening 12 discharges into the mouth passage 7. It is preferable that the two closures 10 and 11 be substantially of the same size so as to permit interchangeability thereof, and to this end the upper edge of the partitioning wall 6 is disposed substantially midway and serves to support the abutting edges of said covers. By transposing the two covers the opening 12 may be brought over the passage 8 to permit ready access to the discharge side of the trap for the purposes of cleaning the same. Furthermore, in extremely cold weather a direct inflow into the sewer may be made by transposing the covers to bring cover 11 over compartment 8. This may be desirable in winter months when the trap is not needed.

Where the trap is to be built into the curb structure of the street, the grating 13a across the opening 12a in the upright wall of the curb will serve to prevent the passage of excess debris into the trap. In this instance, the two covers 10 and 11a will preferably be solid throughout but interchangeable and removable for gaining access to the underlying passage.

What is claimed is:

1. A sewer trap comprising relatively superimposed sections each section being a unitary body having an encircling wall, the lower section having a catch basin and a discharge passage and the superimposed section having a partitioning wall dividing the same into an inlet passage and an outlet compartment and extending down into the catch basin forming therewith a water seal, said extending part of the wall engaging opposing walls of the lower section to interlock the superimposed sections against lateral displacement.

2. A sewer trap comprising a pair of sections superimposed one upon the other, each section being cast from concrete into a unitary body, the bottom section having a catch basin and an outflow, the superimposed section having an inclined partitioning wall extending down into the basin for effecting a liquid seal, said partitioning wall serving in part to define an inlet to the basin and a pair of top openings, a pair of interchangeable cover members for the openings, and means carried by the partitioning wall for interlocking the sections together against lateral displacement.

3. A sewer trap comprising a plurality of relatively superimposed hollow cast sections, the bottom section having a catch basin and an upper section having a partitioning wall, said wall forming a liquid seal with the catch basin and dividing the upper section into a pair of passages and a pair of top openings, an inlet for one of the passages, and a plurality of interchangeable covers for the top openings.

4. A sewer trap comprising a plurality of relatively superimposed hollow sections, the bottom section having a catch basin and the adjacent upper section having an inclined partitioning wall, said wall forming a liquid seal with the catch basin and dividing the upper section into inlet and outlet passages and a pair of substantially equal top openings and a plurality of interchangeable covers for the openings, one of said covers being provided with an inlet opening.

5. A sewer trap comprising a plurality of relatively superimposed hollow sections, the bottom section having a catch basin and the adjacent upper section having side walls and a partitioning wall, said partitioning wall defining an inflow passage and an outflow compartment and being thinner than the side walls of the section to effect the ready transmission of heat from the outflow compartment at the sewer side of the trap through the partitioning wall to the inflow passage of the trap to raise the temperature in said passage and thereby avoid the freezing of the liquid in the catch basin.

6. A sewer trap comprising a pair of hollow blocks the lower block having a catch basin and an outflow passage separated from the basin by an upstanding wall, the upper block being open at its upper and lower sides and having a partitioning wall for substantially the full depth thereof defining a mouth passage and a discharge passage, the upper edges of the upper block and partition wall constituting a seat for removable closure means, said partitioning wall cooperating with the basin to effect a liquid seal against the passage of sewer gas about the lower edge of said partitioning wall, said partitioning wall interlockingly engaging with the walls of the catch basin to hold the two sections against displacement.

7. A sewer trap comprising a pair of hollow cast concrete sections the lower section having a catch basin and an outflow passage separated from the basin by an upstanding wall, the upper section having an inclined relatively thin partitioning wall defining with the walls of the sections a mouth passage and a discharge passage, said partitioning wall cooperating with the walls of the basin to effect a liquid seal against the passage of sewer gas about the lower edge thereof, said gas acting directly on said wall to heat the same and preventing freezing of the liquid seal, and means for interlocking the sections together.

ROBERT T. MORRISON.
ROBERT J. CROFT.